United States Patent
Jayaram

(10) Patent No.: US 12,052,131 B2
(45) Date of Patent: Jul. 30, 2024

(54) MULTI-DIMENSIONAL CORRELATION FOR NETWORK INCIDENT MANAGEMENT

(71) Applicant: T-Mobile USA, Inc., Bellevue, WA (US)

(72) Inventor: Prabha Jayaram, Cranbury, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/983,083

(22) Filed: Nov. 8, 2022

(65) Prior Publication Data

US 2024/0154855 A1   May 9, 2024

(51) Int. Cl.
*H04L 41/0631* (2022.01)
*H04L 41/0604* (2022.01)
*H04L 41/12* (2022.01)

(52) U.S. Cl.
CPC ...... *H04L 41/0631* (2013.01); *H04L 41/0627* (2013.01); *H04L 41/12* (2013.01)

(58) Field of Classification Search
CPC ..................................................... H04L 41/12
See application file for complete search history.

(56) References Cited

U.S. PATENT DOCUMENTS

| | | | |
|---|---|---|---|
| 6,873,619 B1 * | 3/2005 | Edwards | H04L 41/12 370/392 |
| 7,050,793 B1 | 5/2006 | Kenward et al. | |
| 7,180,860 B2 | 2/2007 | Fonden et al. | |
| 7,330,889 B2 | 2/2008 | Foody et al. | |
| 7,355,986 B2 | 4/2008 | Vanderveen et al. | |
| 7,519,734 B1 | 4/2009 | Dumitriu et al. | |
| 7,525,919 B2 | 4/2009 | Matsui et al. | |
| 7,545,736 B2 | 6/2009 | Dziong et al. | |
| 7,631,222 B2 | 12/2009 | Hasan et al. | |
| 7,636,335 B2 | 12/2009 | Rune et al. | |
| 7,644,182 B2 | 1/2010 | Banerjee et al. | |
| 7,764,596 B2 | 7/2010 | Saleh et al. | |
| 7,814,322 B2 | 10/2010 | Gurevich et al. | |
| 7,821,946 B2 | 10/2010 | Mack-crane et al. | |
| 7,827,279 B2 | 11/2010 | Xu et al. | |
| 8,015,139 B2 | 9/2011 | Bahl et al. | |

(Continued)

FOREIGN PATENT DOCUMENTS

| CN | 102571856 B | 4/2015 |
|---|---|---|
| CN | 102469410 B | 4/2016 |

(Continued)

*Primary Examiner* — Philip J Chea
*Assistant Examiner* — James Ross Hollister
(74) *Attorney, Agent, or Firm* — Perkins Coie LLP

(57) ABSTRACT

Systems, methods, and devices that relate to efficient incident management using multi-dimensional correlation across different layers of the network are disclosed. In one example aspect, a method for wireless communication includes receiving reporting information about a network incident associated with multiple network nodes in a network, and identifying a network node or a connection between two network nodes as a root cause for the network incident based on a multi-dimensional correlation that correlates one or more sets of horizontal information in respective layers of an Open Systems Interconnection (OSI) model and vertical information across multiple layers of the OSI model.

20 Claims, 11 Drawing Sheets

(56) References Cited

U.S. PATENT DOCUMENTS

| | | |
|---|---|---|
| 8,059,560 B2 | 11/2011 | Ushiyama et al. |
| 8,099,760 B2 | 1/2012 | Cohen et al. |
| 8,565,750 B2 | 10/2013 | Fischer |
| 8,804,746 B2 | 8/2014 | Wu et al. |
| 8,856,386 B2 | 10/2014 | Dutta et al. |
| 8,934,334 B2 | 1/2015 | Kim et al. |
| 9,049,249 B2 | 6/2015 | Zhang et al. |
| 9,125,133 B2 | 9/2015 | Ji et al. |
| 9,160,571 B2 | 10/2015 | Banerjee et al. |
| 9,167,004 B2 | 10/2015 | Pappu et al. |
| 9,204,207 B2 | 12/2015 | Deruijter et al. |
| 9,288,555 B2 | 3/2016 | Srinivas et al. |
| 9,325,805 B2 | 4/2016 | Shattil |
| 9,356,764 B2 | 5/2016 | Nama et al. |
| 9,407,693 B2 | 8/2016 | Singhal et al. |
| 9,558,743 B2 | 1/2017 | Coccaro et al. |
| 9,779,385 B2 | 10/2017 | Rajaram |
| 9,875,127 B2 | 1/2018 | Thakkar et al. |
| 10,229,356 B1 | 3/2019 | Liu et al. |
| 10,263,951 B2 | 4/2019 | Kielhofner et al. |
| 10,277,461 B1 | 4/2019 | A et al. |
| 10,333,849 B2 | 6/2019 | Masurekar et al. |
| 10,404,556 B2 | 9/2019 | Reynolds et al. |
| 10,432,342 B1 | 10/2019 | Bathula et al. |
| 11,301,718 B2 | 4/2022 | Hamedi et al. |
| 11,329,886 B2 | 5/2022 | Sirton |
| 2009/0103453 A1 | 4/2009 | Hand et al. |
| 2012/0036229 A1 | 2/2012 | Uyama et al. |
| 2014/0119196 A1* | 5/2014 | Hui ............... H04L 41/065 370/241 |
| 2018/0115469 A1* | 4/2018 | Erickson ......... H04L 41/0853 |
| 2018/0367368 A1* | 12/2018 | Schulz ............ G05B 19/4186 |
| 2021/0044608 A1* | 2/2021 | Deaguero ........... H04L 41/40 |
| 2021/0303632 A1* | 9/2021 | Parthasarathy ..... G06F 11/3006 |

FOREIGN PATENT DOCUMENTS

| | | |
|---|---|---|
| CN | 103248521 B | 9/2016 |
| CN | 104272637 B | 10/2018 |
| CN | 104272636 B | 1/2019 |
| CN | 107767262 B | 7/2020 |
| CN | 106533973 B | 1/2021 |
| CN | 109639786 B | 6/2021 |
| CN | 109548174 B | 9/2021 |
| EP | 2583211 B1 | 4/2020 |

* cited by examiner

MULTI-DIMENSIONAL CORRELATION FOR NETWORK INCIDENT MANAGEMENT

BACKGROUND

Incident management is in the Information Technology Service Management (ITSM) process area. The goal of an incident management process is to restore a normal service operation as quickly as possible and to minimize the impact on business operations, thus ensuring that the best possible, or operationally sufficient, levels of service quality and availability are maintained. Network incident management involves the monitoring and detection of network events on a computer network, and the execution of proper responses to those events.

BRIEF DESCRIPTION OF THE DRAWINGS

Detailed descriptions of implementations of the present technology will be described and explained through the use of the accompanying drawings.

Figure 1:
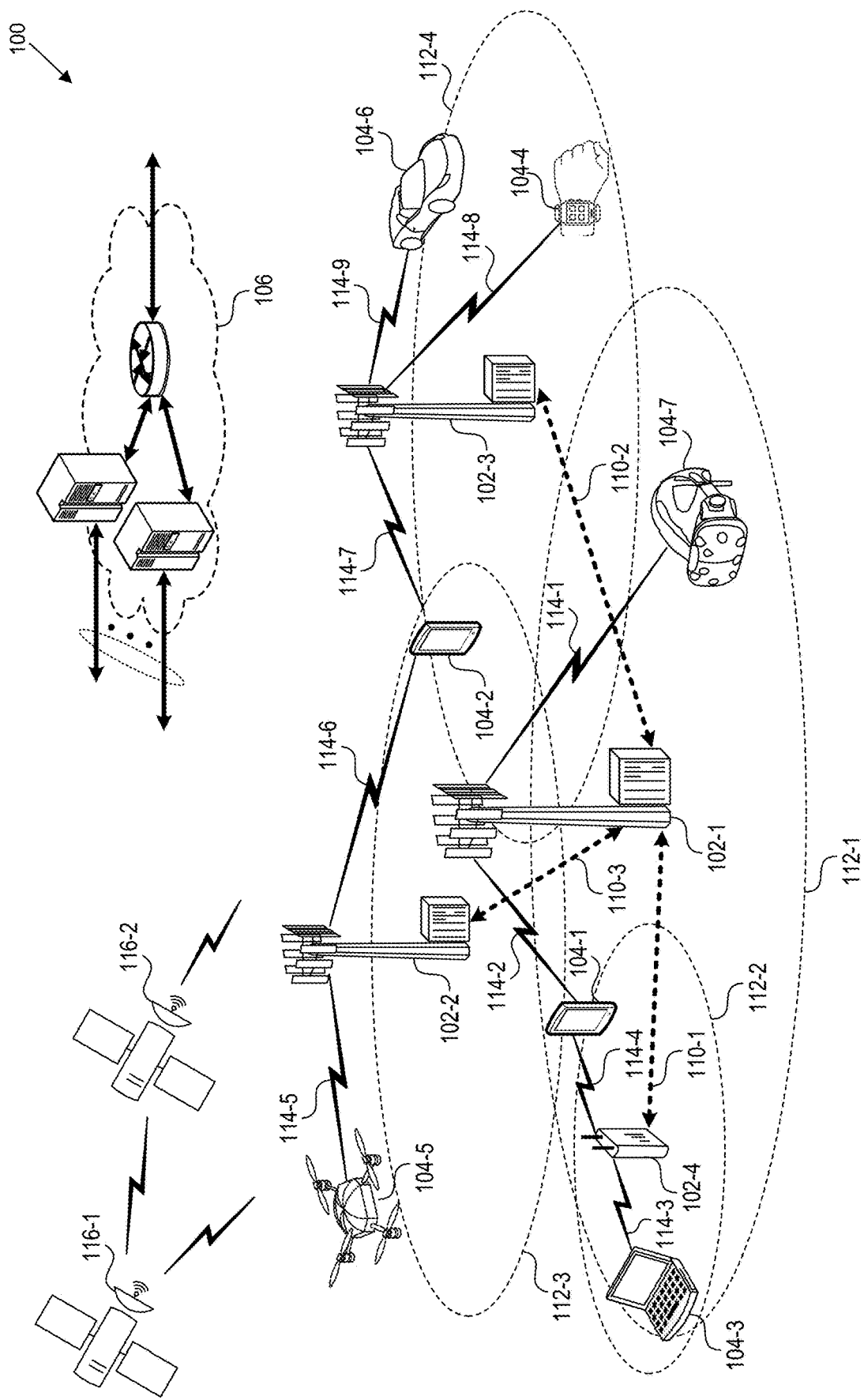
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

As network technology advances, more complex network architectures are adopted to provide solid network infrastructures and to enable efficient and secure communications for the users. While the complexity of the network architecture brings benefits in certain aspects (e.g., robustness, security) for various application scenarios (e.g., enterprise uses, telephonic systems), it can also introduce challenges when incidents appear in the network. A single incident that occurs at one particular network node can quickly propagate across different layers to different network nodes, impacting various services and leading to difficulty in incident management.

The network architectures are compliant with a conceptual layer model referred to as the Open Systems Interconnection (OSI) model regardless of their respective complexity levels. To address the challenges in incident management due to the complex network architectures, a multi-dimensional correlation approach that correlates information horizontally in each layer and vertically across multiple layers can be used to efficiently pinpoint the network node(s) in lower layer(s). The root-cause node(s) can be tracked by correlating the per-layer network information (such as service usage information and/or network utilization rates in the layer) with the topology of the nodes across different layers. For example, usage information of a particular service that has been interrupted can be tracked in a higher layer to identify a first set of candidate nodes that may have caused the interruption. The usage information can be optionally correlated, in a per-layer horizontal direction, with connection status of the network (e.g., network utilization rates) to eliminate certain nodes from the set of candidate nodes. The results are then further correlated in the vertical direction across different multiple layers (e.g., using network topologies) to pinpoint the root cause of the network issues.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, ARNR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Function

Figure 2:
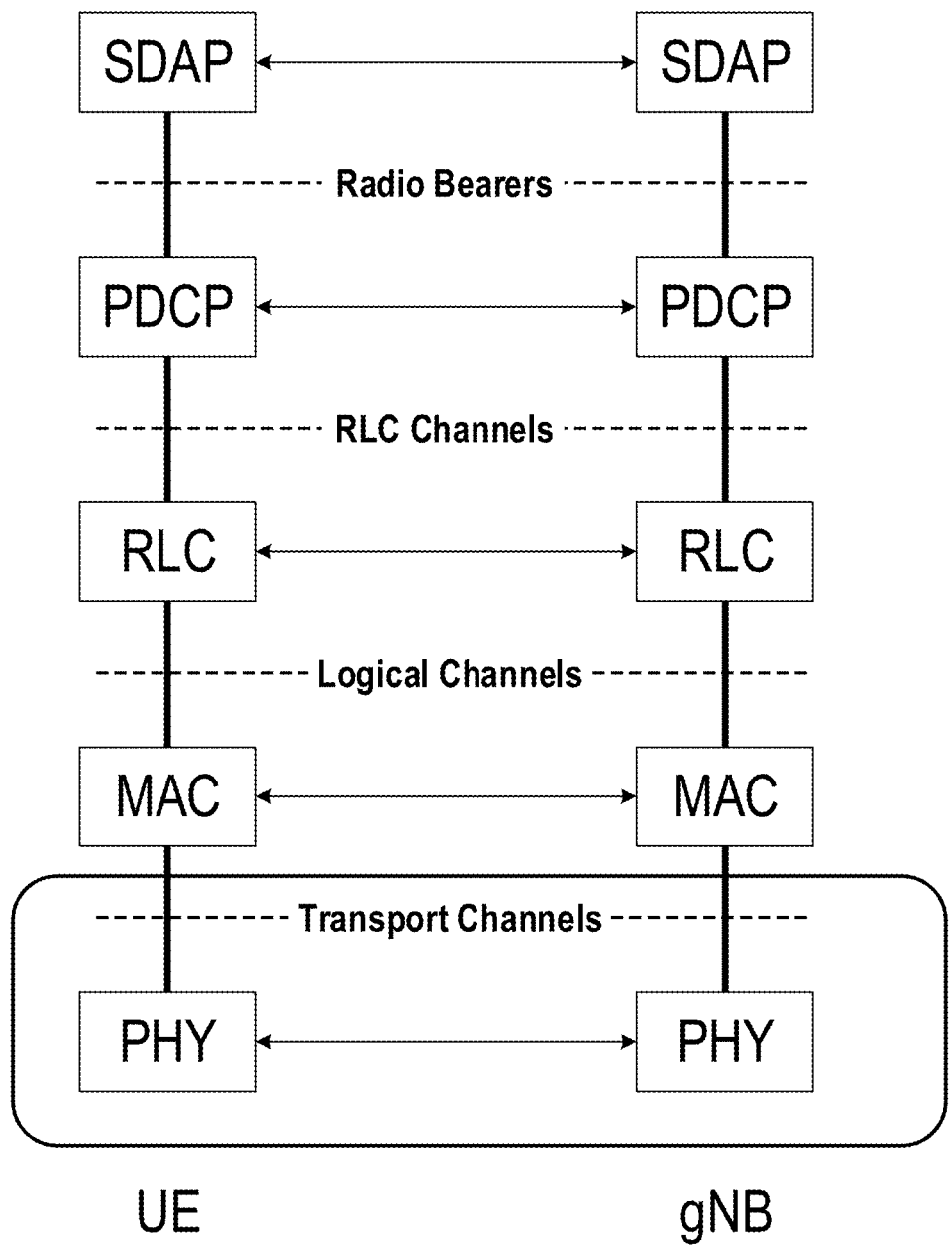
FIG. 2 illustrates an example user plane protocol stack in radio protocol architecture.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Multi-Dimensional Correlation

The Open Systems Interconnection (OSI) model is a conceptual model in which the communications between a computing system are split into seven different abstraction layers: Physical, Data Link, Network, Transport, Session, Presentation, and Application. Table 1 shows example functions for the layers and the associated Protocol Data Unit (PDU) used in each layer.

TABLE 1

Example Functions for OSI Model Layers

| Layer | | Protocol Data Unit (PDU) | Function |
|---|---|---|---|
| 7 | Application | Data | High-level protocols such as for resource sharing or remote file access |
| 6 | Presentation | | Translation of data between a networking service and an application |
| 5 | Session | | Managing communication sessions |
| 4 | Transport | Segment, Datagram | Reliable transmission of data segments between points on a network |
| 3 | Network | Packet | Structuring and managing a multi-node network |
| 2 | Data Link | Frame | Transmission of data frames between two nodes connected by a physical layer |
| 1 | Physical | Bit, Symbols | Transmission and reception of raw bit streams over a physical medium |

In LTE/LTE-A and 5G wireless communication systems, the OSI model is adapted to include the following protocol entities: the Service Data Adaptation Protocol (SDAP), the Packet Data Convergence Protocol (PDCP), the Radio Link Control (RLC), the Medium Access Control (MAC), and the Physical Layer (PHY). For example, the Radio Resource Control (RRC) protocol used in wireless communication is a Layer 3 (L-3) protocol between a User Equipment (UE) and the base station. The MAC sublayer and the RLC sublayer are referred to as Layer 2 (L2). The PHY layer is referred to as Layer 1 (L1).

Figure 3:
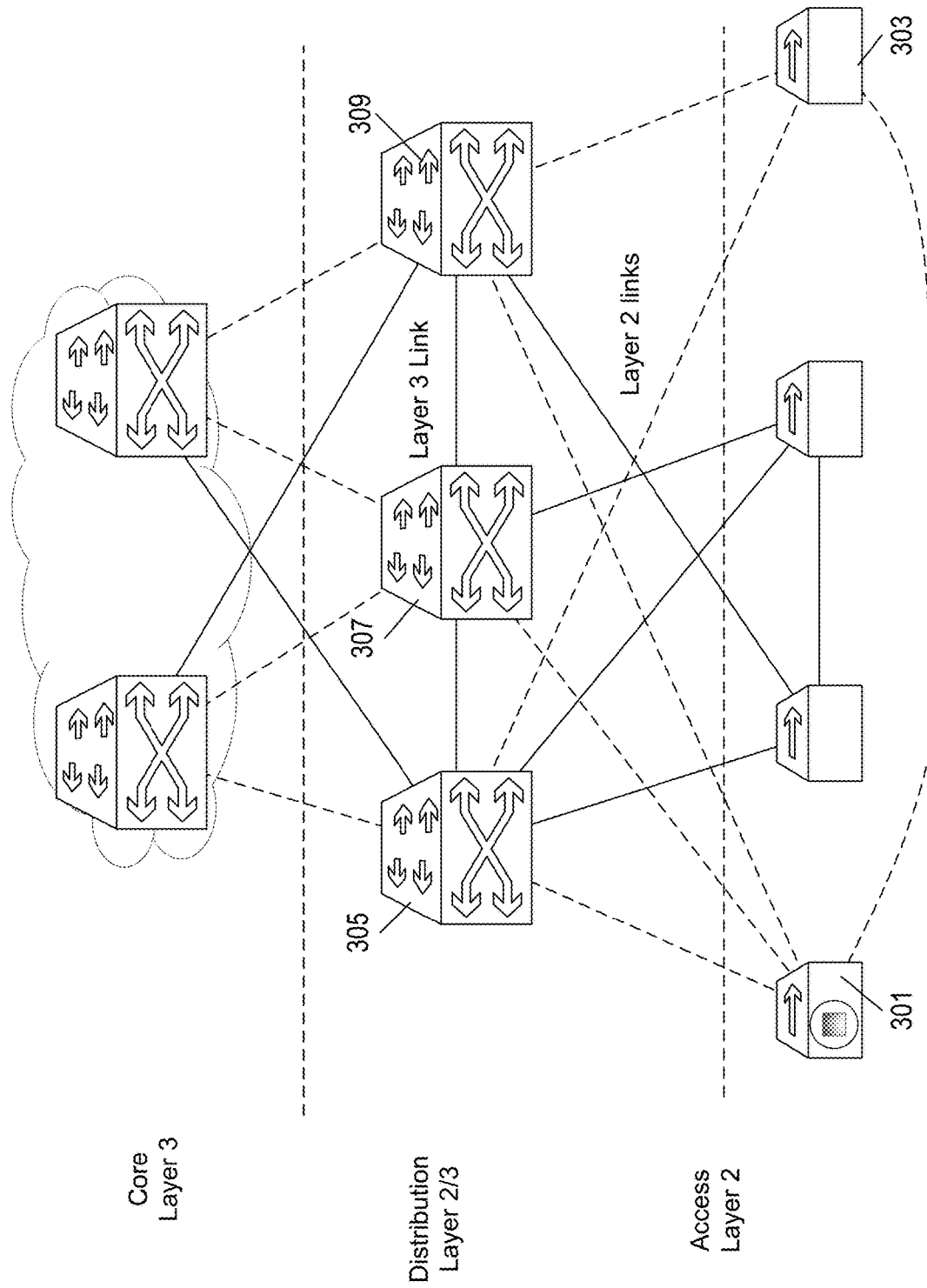
FIG. 3 illustrates an example multi-tier network architecture for an enterprise IP network.

To provide solid network infrastructures for campuses, enterprises and/or IP telephonic systems, a multi-tier network architecture is often utilized. FIG. 3 illustrates an example multi-tier network architecture for an enterprise IP network. In FIG. 3, the access tier is the first point of entry into the network for edge devices, end stations, and IP phones. The distribution tier aggregates nodes from the access tier. Deployed as a pair of L3 switches, the distribution tier can use L3 switching for its connectivity to the core of the network and L2 services for its connectivity to the access tier. The core serves as the backbone for the network. Various complex network architectures based on the multi-tier concept can also be devised and adopted.

As shown in FIG. 3, the multi-tier network architecture (e.g., access tier, distribution tier, core tier) can create complexity topologies among network nodes that are connected using different links at different protocol layers (L2, L3, etc.). In some cases, a degradation in a lower protocol layer (e.g., L1, L2) can result in numerous connectivity issues impacting numerous network devices and servers in upper protocol layers. For example, when an incident occurs in node 301 (e.g., Node Down), the incident can impact the nodes that node 301 connects to via Layer 2 links, including both nodes at the access tier (e.g., node 303) and nodes at the distribution tier (e.g., nodes 305, 307, 309). The incident can quickly propagate across different tiers and result in numerous error notifications. Such propagation of the errors makes efficient incident management extremely difficult. A large amount of manual effort is often required to examine and rule out redundant error information.

Figure 4:
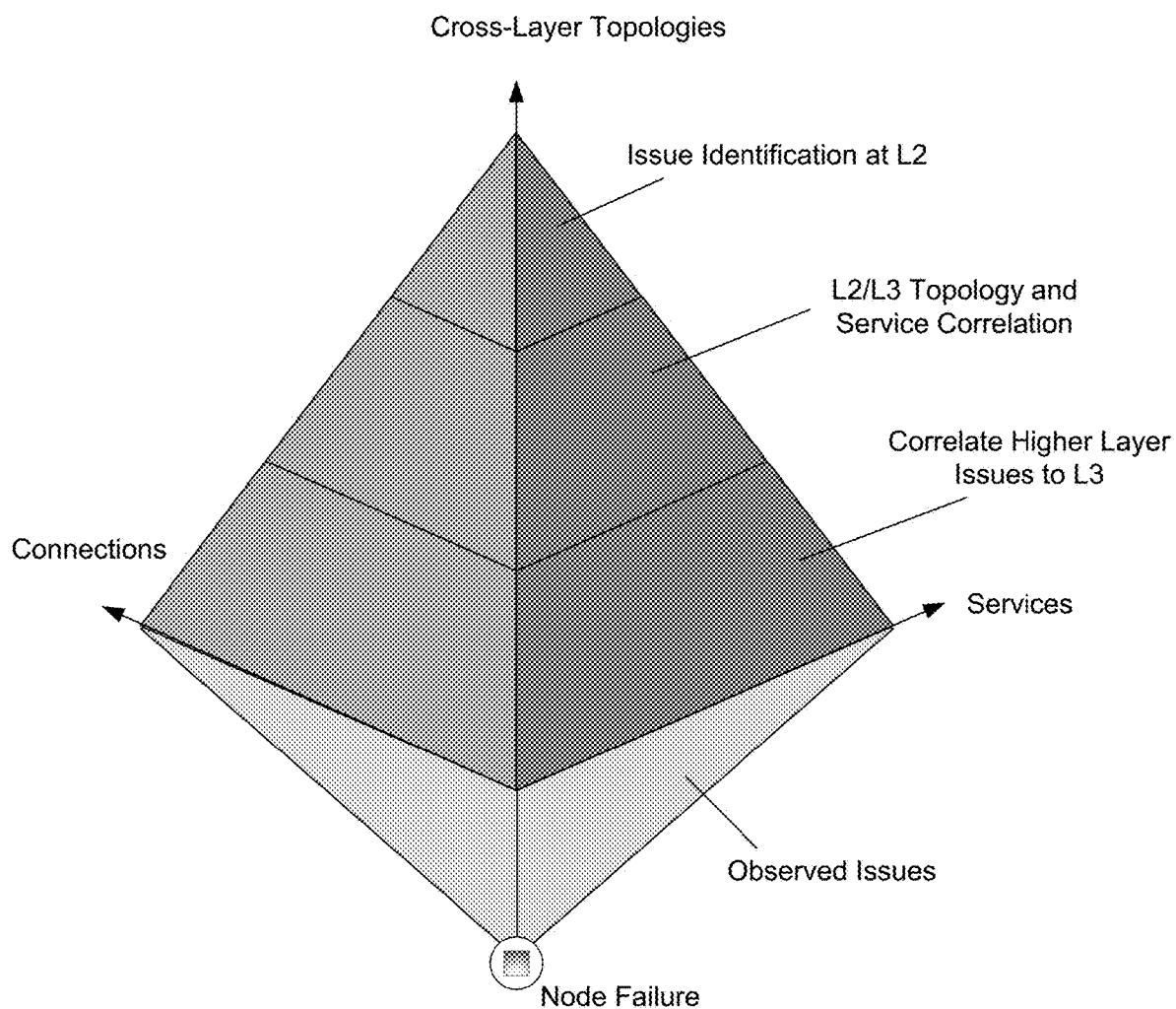
FIG. 4 illustrates a conceptual diagram of multi-dimensional correlation in accordance with one or more embodiments of the present technology.

This patent document discloses techniques that can be implemented in various embodiments to enable efficient incident management using multi-dimensional correlation based on horizontal information in each protocol layer (e.g., service information and/or connection status in each protocol layer) and vertical information across multiple protocol layers (e.g., cross-layer topology information). FIG. 4 illustrates a conceptual diagram 400 of multi-dimensional correlation in accordance with one or more embodiments of the present technology. As discussed above and shown in FIG. 4, a few incidents at a lower protocol layer (e.g., a node failure) can quickly propagate to upper layers and lead to a vast amount of issue reporting. To efficiently manage the incidents, information about the observed issues from issue reporting can be correlated both within the same protocol layer (also referred to as the horizontal dimension) and across multiple protocol layers (also referred to as the vertical dimension) so as to trace the incident back to the root-cause node(s) in lower protocol layer(s). The correlation can be performed by a network node in the core network. For example, the network node can be part of one of the network functions illustrated in FIG. 2. The network node for performing the correlation can also be a standalone core network server that is dedicated to error reporting and processing.

Figure 5A:
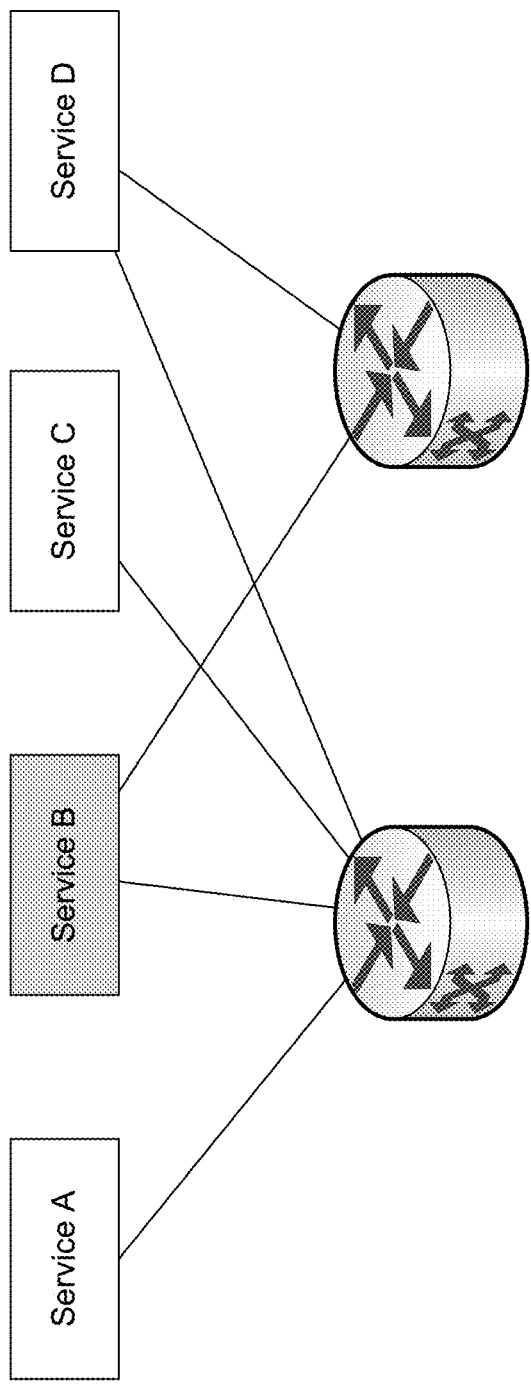
FIG. 5A illustrates an example correlation based on service information available in a protocol layer in accordance with one or more embodiments of the present technology.

Correlation in the horizontal dimension can be performed based on different types of information obtainable in the same protocol layer. For example, as shown in FIG. 4, service information and/or connection information within a protocol layer can be used to correlate with the issue reporting. FIG. 5A illustrates an example correlation based on service information available in a protocol layer in accordance with one or more embodiments of the present technology. For example, the session layer (Layer 5, as shown in Table 1) provides inter-process communication between two systems. The session layer provides the mechanism for opening, closing, and managing a session between end-user application processes. In case of a connection loss, the session layer provides restoration and/or recovery services to re-establish the connection. By tracking and correlating usage information about a particular service B (e.g., restoration service) in a protocol layer, one or more network nodes can be identified, and information associated with the identified network nodes can be further correlated to help identify the root cause of the network issues. As another example, application-level service information, such as information regarding roaming services, cloud services, high-bandwidth data transmission services, is available the application layer (Layer 7). When an application-service is interrupted, information regarding the interruption or error can be tracked by identify one or more network nodes that are associated with the service. Information associated with the identified network nodes can be further correlated to help root cause the network incidents.

Table 2 shows example network error reporting (also referred to as alarms) associated with the transport layer (Layer 4). Alarm entries that indicate the same type of alarms in L4 (e.g., BGPPeerSessionDown) at the same network node occurred around a similar time frame can be correlated for subsequent identification of the root cause.

TABLE 2

| Time | Network Node | Alarm Type |
| --- | --- | --- |
| Apr. 14, 2021 7:10:33 AM | NODE009 | BGPPeerSessionDown |
| Apr. 14, 2021 7:10:34 AM | NODE009 | BGPPeerSessionDown |
| Apr. 14, 2021 7:10:35 AM | NODE009 | BGPPeerSessionDown |
| Apr. 14, 2021 7:11:20 AM | NODE010 | BGPPeerSessionDown |

Table 3 shows example network alarms associated with the Layer 3. The BGP Down alarm can be generated due to loss of connectivity between two network nodes. Alarm entries that indicate the same type of alarms in L3 (e.g., BGP Down) at the same network node(s)/interface (e.g., the same Node009 Interface, or NODE009) occurred around a similar time frame can be correlated for subsequent identification of the root cause.

TABLE 3

| Time | Node 1 | Node 2 | Alarm Type | Comments |
| --- | --- | --- | --- | --- |
| Apr. 14, 2021 7:07:52 AM | NODE031 | NODE009 | BGP Down | Node009 Interface |
| Apr. 14, 2021 7:07:57 AM | NODE032 | NODE009 | BGP Down | Node009 Interface |
| Apr. 14, 2021 7:08:04 AM | NODE009 | NODE036 | BGP Down | Node009 Interface |

Figure 5B:
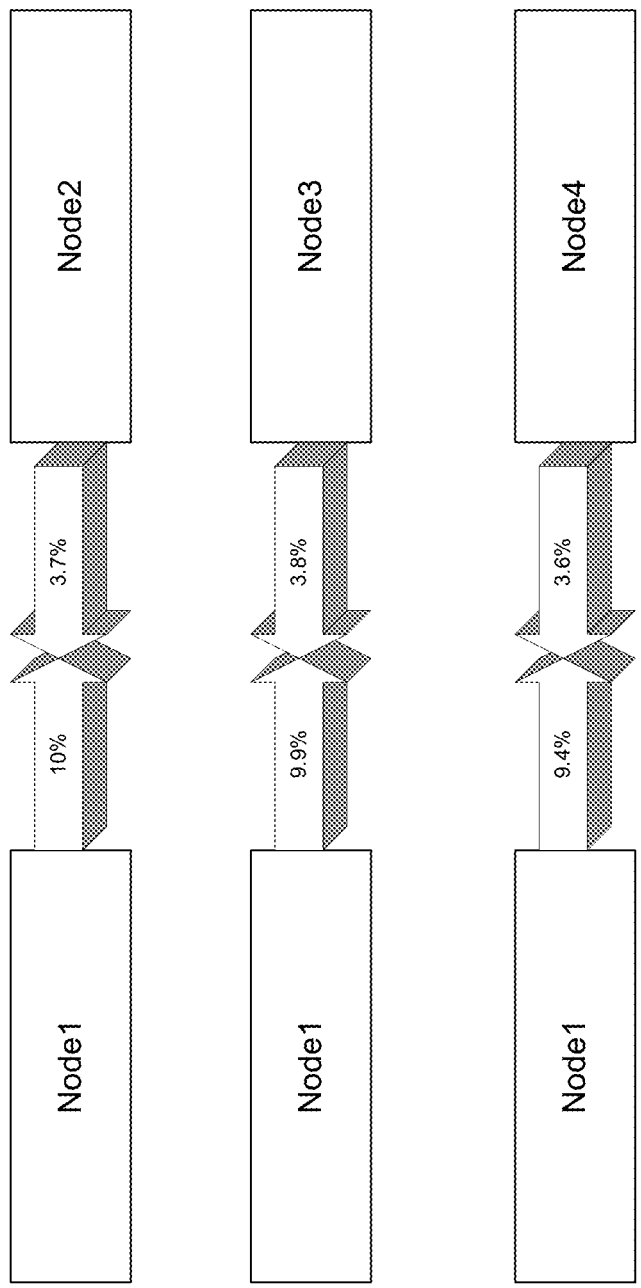
FIG. 5B illustrates an example correlation based on network connection status in a protocol layer in accordance with one or more embodiments of the present technology.

FIG. 5B illustrates an example correlation based on network connection status in a protocol layer in accordance with one or more embodiments of the present technology. In this example, the network utilization rates of different connections to Node1 at the network layer (Layer 3) are examined to identify which node(s) are likely to be impacted when Node1 goes down, and which node(s) can impact Node1 when there are connection issues on their end. For example, if a network issue is observed on Node 1 (e.g., based on issue reporting), a probability rating can be assigned to each node connected to Node1 based on the network utilization rates. In some embodiments, a lower utilization rate can be assigned a higher probability rating, as the connection is likely to be unstable when the utilization rate is low. The nodes can be ranked based on the respective probability rates, and a subset of nodes with probability ratings higher than a predetermined threshold can be identified.

Figure 6A:
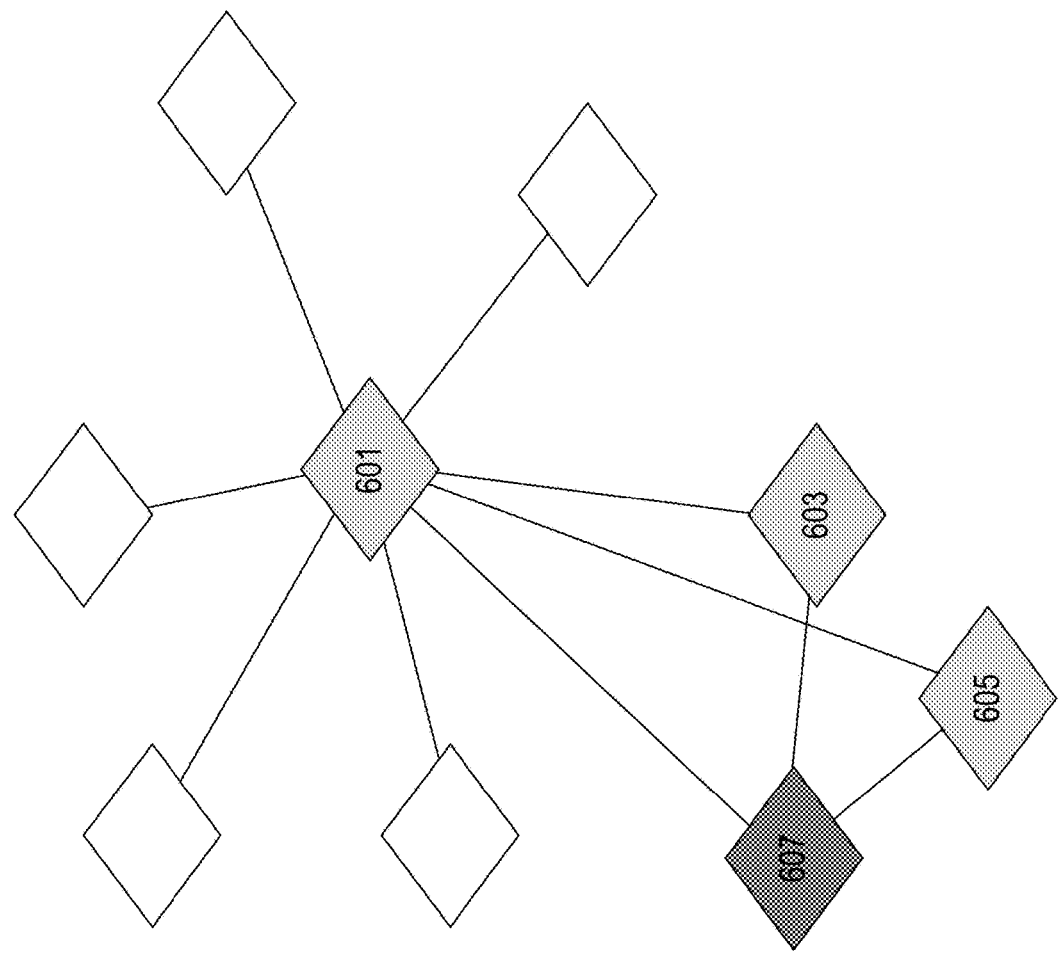
FIG. 6A illustrates an example Layer 3 topology in accordance with one or more embodiments of the present technology.
Figure 6B:
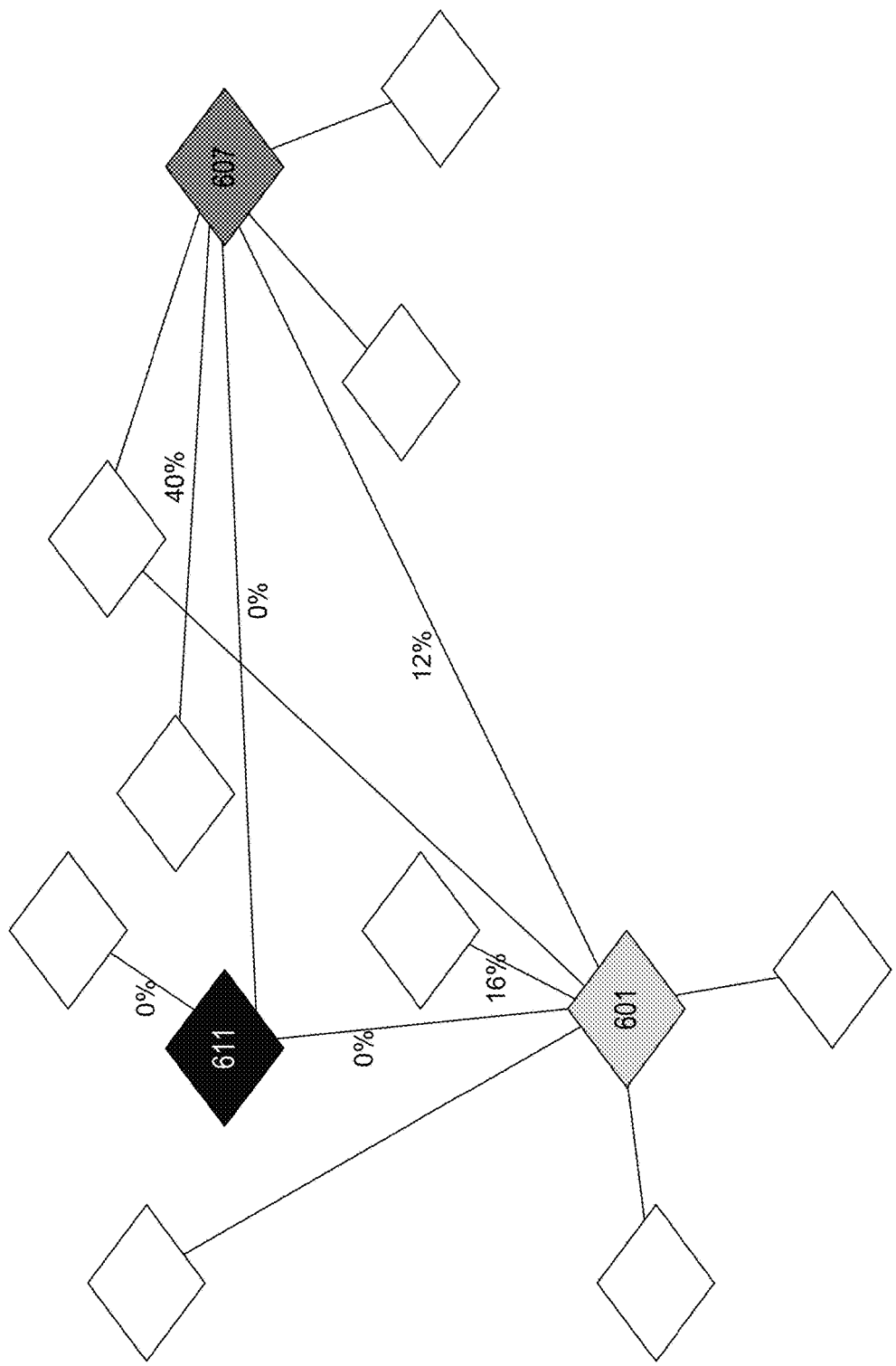
FIG. 6B illustrates an example Layer 2 topology in accordance with one or more embodiments of the present technology.

Correlation in the vertical dimension can be performed based on network topologies at different protocol layers. FIG. 6A illustrates an example Layer 3 topology in accordance with one or more embodiments of the present technology. FIG. 6B illustrates an example Layer 2 topology in accordance with one or more embodiments of the present technology. In FIG. 6A, nodes 601, 603, 605, and 607 have been identified as candidate nodes based on information in the session layer (e.g., being associated with a particular type of network alarms). The Layer 3 topology as shown in FIG. 6A indicates that the identified nodes are interconnected with each other. The connection issues observed in the session layer or Layer 4 may have been caused by only one or two of these identified nodes or interfaces (e.g., NODE009, and Node009 Interface as shown in Tables 2 and 3 above). The Layer 2 topology can be further correlated with the Layer 3 topology. In this example, nodes 601 and 607 appear in both Layer 3 topology and Layer 2 topology, indicating that they are probably network nodes in the distribution tier (e.g., as shown in FIG. 3). Correspondingly, nodes 603 and 605, which only appear in Layer 3 topology, can be eliminated from the candidate list.

At Layer 2, information from the horizontal dimension (e.g., network utilization rates among connected nodes) can be used to further pinpoint the root cause of the observed network issues. FIG. 6B illustrates an overlay of the network utilization information with the L2 topology. For example, the network utilization between node 607 and node 601 is 12%, while the network utilization between node 607 and 611 is 0%. Similarly, the network utilization between node 601 and 611 is 0% while the utilization rates between node 601 and other nodes are within the normal range. Correspondingly, the root cause for the connection errors observed at Layer 3 and/or Layer 4 can be traced back to node 611 at Layer 2. The identified incident result (e.g., node 611) can be further verified by other types of information available in Layer 2 (the horizontal dimension).

As another example, when Layer 2 has failures, the root cause of the failures can be identified based on alarm patterns of all components in Layer 2. A component in Layer 2 can generate different types of alarms based on changes of the node state, the power state, the performance, the temperature and/or other hardware status. A pattern of the alarms can be provided by correlating the same type(s) of alarm(s) at the same network node/interface occurred around a similar time frame to further determine the root cause of the failures.

Figure 7:
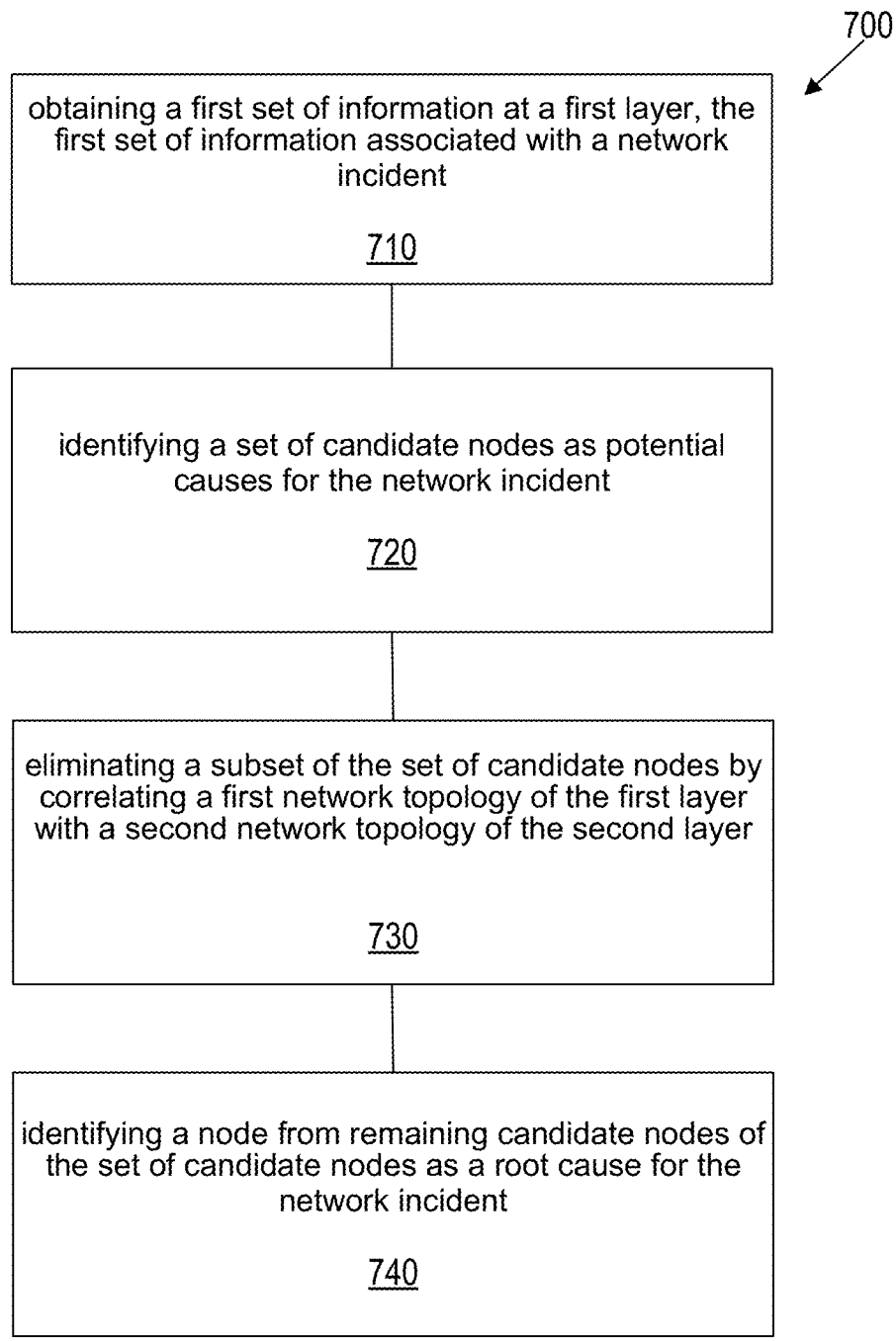
FIG. 7 is a flowchart representation of a process or a method for wireless communication in accordance with one or more embodiments of the present technology.

FIG. 7 is a flowchart representation of a process or a method for wireless communication in accordance with one or more embodiments of the present technology. The process 700 includes, at operation 710, obtaining a first set of information at a first layer, the first set of information associated with a network incident. The process 700 includes, at operation 720, identifying a set of candidate nodes as potential causes for the network incident based on the first set of information. The process 700 includes, at operation 730, eliminating a subset of the set of candidate nodes by correlating a first network topology of the first layer with a second network topology of a second layer. The second layer is lower than the first layer in an Open Systems Interconnection (OSI) model. The process 700 also includes, at operation 740, identifying a node from remaining candidate nodes of the set of candidate nodes as a root cause for the network incident based on a second set of information at the second layer.

In some embodiments, the first layer comprises a transport layer (L3) and the second layer comprises a data link layer (L2). In some embodiments, the identifying of the set of candidate nodes comprises correlating a third set of information at a session layer with the first set of information at the first layer. The first set of information can include information about services or connection status at the first layer, and the second set of information can include information about services or connection status at the second layer.

Figure 8:
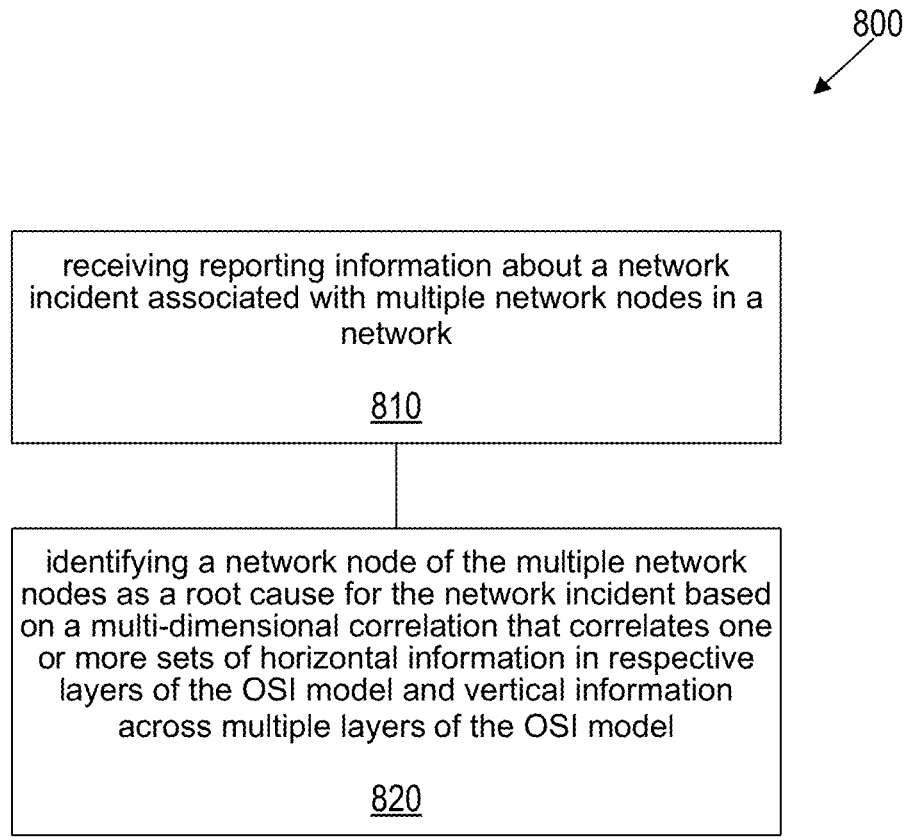
FIG. 8 is a flowchart representation of a method or a process for wireless communication in accordance with one or more embodiments of the present technology.

FIG. 8 is a flowchart representation of a method or a process 800 for wireless communication in accordance with one or more embodiments of the present technology. The process 800 includes, at operation 810, receiving reporting information about a network incident associated with multiple network nodes in a network. The process 800 also includes, at operation 820, identifying a network node or a connection between two network nodes (e.g., a transport circuit between routers) as a root cause for the network incident based on a multi-dimensional correlation that correlates one or more sets of horizontal information in respective layers of an Open Systems Interconnection (OSI) model and vertical information across multiple layers of the OSI model.

In some embodiments, the multiple network nodes are deployed based on a multi-tier network architecture that comprises an access tier, a distribution tier, and a core tier (e.g., as shown in FIG. 3). In some embodiments, each set of horizontal information corresponds to one layer of the OSI model. The horizontal information includes services or connection status of the layer. In some embodiments, the vertical information across multiple layers of the OSI model comprises topology information of at least two of the multiple layers (e.g., as shown in FIG. 6A and FIG. 6B). In some embodiments, the root cause for the network incident is identified at a data link layer (L2).

Computer System

Figure 9:
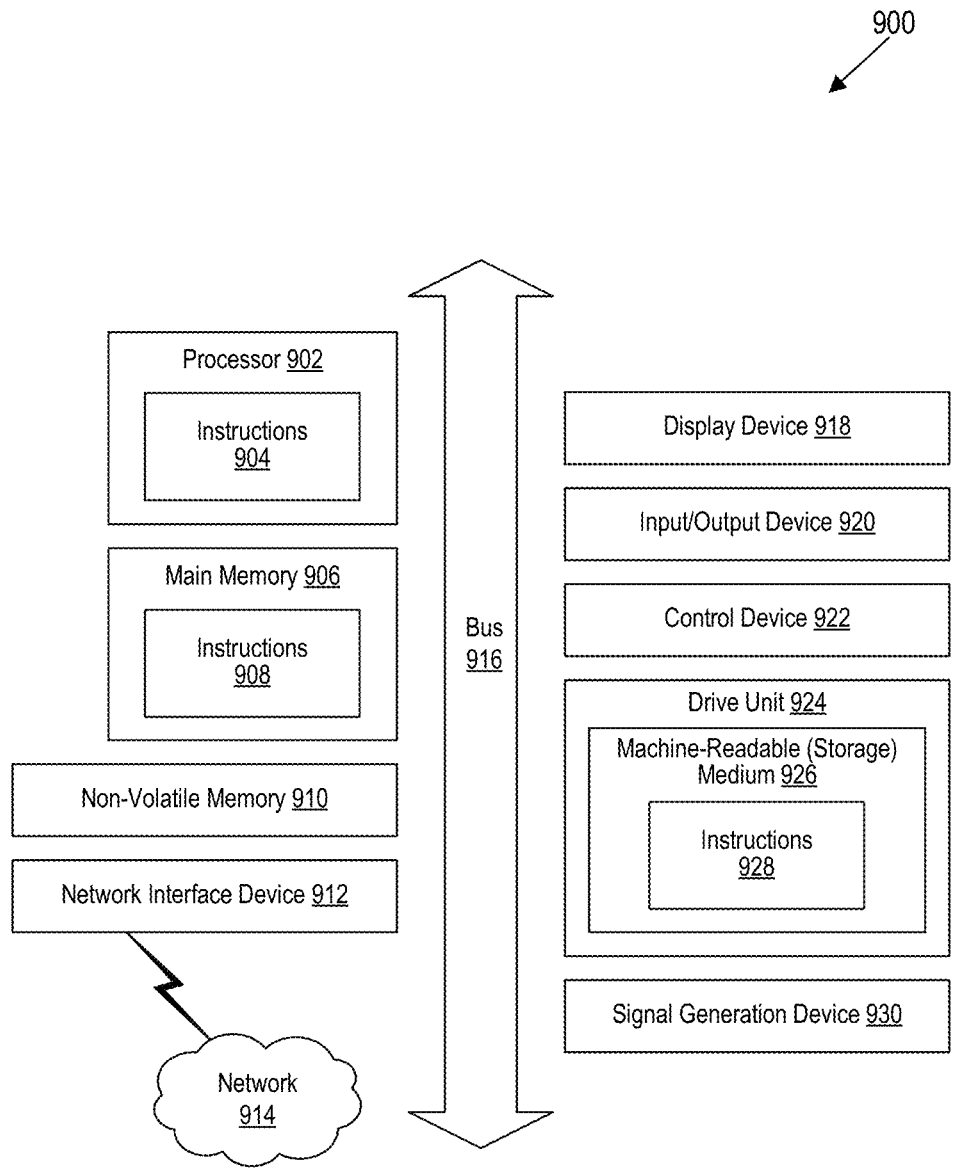
FIG. 9 is a block diagram that illustrates components of a computing device.

FIG. 9 is a block diagram that illustrates an example of a computer system 900 in which at least some operations described herein (e.g., FIG. 7 and FIG. 8) can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A method for wireless communication, comprising:
   obtaining a first set of information at a first layer, the first set of information associated with a network incident,
      wherein the first layer comprises a session layer or a transport layer,
      wherein the first set of information comprises information about services or connection status at the first layer;
   identifying a set of candidate nodes as potential causes for the network incident based on the first set of information;
   eliminating a subset of the set of candidate nodes by correlating a first network topology of the first layer with a second network topology of a second layer,
      wherein the second layer is lower than the first layer in an Open Systems Interconnection (OSI) model, and
      wherein the first network topology indicates a first set of network nodes interconnected with each other in the first layer,
      wherein the second network topoloqy indicates a second set of network nodes interconnected with each other in the second layer, and
      wherein the subset of the set of candidate nodes is eliminated due to not being associated with any of the second set of network nodes of the second laver; and
   identifying a node from remaining candidate nodes of the set of candidate nodes as a root cause for the network incident based on network utilization rates among the remaining candidate nodes at the second layer.

2. The method of claim 1, wherein the identifying of the set of candidate nodes comprises:
   correlating a third set of information at a third layer with the first set of information at the first layer,
      wherein the third layer is higher than the first layer in the OSI model.

3. The method of claim 1, wherein the identifying of the set of candidate nodes comprises:
   tracking usage information of a first type of service in the first layer, wherein the first type of service is associated with restoring or recovery of a network connection; and
   determining one or more nodes that use the first type of service as the set of candidate nodes.

4. The method of claim 1, wherein the identifying of the set of candidate nodes comprises:
   detecting a service interruption of a second type of service;
   tracking usage information of the second type of service among network nodes; and
   determining one or more nodes that use the second type of service as the set of candidate nodes.

5. The method of claim 1, wherein the identifying of the set of candidate nodes comprise:
   determining a plurality of network nodes that are connected to a first node;
   assigning a probably rating to each of the plurality of network nodes based on a utilization rate of a corresponding network connection; and selecting one or more network nodes having probability rates that are higher than a predetermined threshold as the set of candidate nodes.

6. The method of claim 1, further comprising:
receiving a set of error reporting associated with the session layer or the transport layer, wherein one or more error patterns exist in the set of error reporting.

7. A method for wireless communication, comprising:
receiving reporting information about a network incident associated with multiple network nodes in a network; and
identifying a network node or a connection between two network nodes as a root cause for the network incident based on a multi-dimensional correlation that correlates one or more sets of horizontal information in respective layers of an Open Systems Interconnection (OSI) model and vertical information across at least a first layer and a second layer of the OSI model,
wherein the multiple network nodes are deployed based on a multi-tier network architecture that comprises an access tier, a distribution tier, and a core tier,
wherein the multi-dimensional correlation is based on correlating a first network topoloqy of the first laver with a second network topoloqy of the second layer,
wherein the first network topology indicates a first set of network nodes interconnected with each other in the first layer,
wherein the second network topoloqy indicates a second set of network nodes interconnected with each other in the second layer, and
wherein a subset of the first set of network nodes is eliminated from being candidate nodes as the root cause due to not being associated with any of the second set of network nodes of the second layer.

8. The method of claim 7, wherein each set of horizontal information corresponds to a layer of the OSI model, wherein each set of the horizontal information comprises at least one of (1) services or connection status of the layer, or (2) network utilization rates among the multiple network nodes.

9. The method of claim 8, wherein the identifying of the network node comprises:
tracking usage information of a first type of service in a layer, wherein the first type of service has been interrupted or is associated with a restoration or a recovery of a network connection; and
determining a set of candidate nodes based on the usage information.

10. The method of claim 8, wherein the identifying of the network node comprises:
assigning a probably rating to each of a plurality network node based on a utilization rate of a corresponding network connection; and
selecting one or more network nodes having probability rates that are higher than a predetermined threshold as a set of candidate nodes.

11. The method of claim 7, comprising:
determining one or more error patterns by correlating the reporting information,
wherein the network node or the connection between the network nodes as the root cause is identified further based on the one or more error patterns.

12. A device for wireless communication, comprising at least one processor that is configured to:
receive reporting information about a network incident associated with multiple network nodes in a network; and
identify a network node or a connection between two network nodes as a root cause for the network incident based on a multi-dimensional correlation that correlates one or more sets of horizontal information in respective layers of an Open Systems Interconnection (OSI) model and vertical information across multiple layers of the OSI model,
wherein the multiple network nodes are deployed across multiple layers of the OSI model, the multiple layers comprising at least a first layer and a second layer, and wherein the processor is configured to receive the reporting information by receiving error reporting messages originated from the multiple layers, and
wherein the multiple network nodes are deployed based on a multi-tier network architecture that comprises an access tier, a distribution tier, and a core tier,
wherein the multi-dimensional correlation is based on correlating a first network topology of the first layer with a second network topology of the second layer,
wherein the first network topoloqy indicates a first set of network nodes interconnected with each other in the first layer,
wherein the second network topology indicates a second set of network nodes interconnected with each other in the second layer, and
wherein a subset of the first set of network nodes is eliminated from being candidate nodes as the root cause due to not being associated with any of the second set of network nodes of the second layer.

13. The device of claim 12, wherein each set of horizontal information corresponds to a layer of the OSI model, wherein each set of the horizontal information comprises at least one of (1) services or connection status of the layer, or (2) network utilization rates among the multiple network nodes.

14. The device of claim 12, wherein the processor is configured to identify the network node based on:
tracking usage information of a first type of service in a layer, wherein the first type of service has been interrupted or is associated with a restoration or a recovery of a network connection; and
determining a set of candidate nodes based on the usage information.

15. The device of claim 12, wherein the processor is configured to identify the network node based on:
assigning a probably rating to each of a plurality network node based on a utilization rate of a corresponding network connection; and
selecting one or more network nodes having probability rates that are higher than a predetermined threshold as a set of candidate nodes.

16. The device of claim 12, wherein the first layer comprises a transport layer, and wherein the second layer comprises a data link layer.

17. The device of claim 16, wherein the processor is configured to identify the set of candidate nodes by correlating a third set of information at a session layer with the first set of information at the first layer.

18. The device of claim 12, wherein the first set of information comprises information about services or connection status at the first layer, and wherein the second set of information comprises information about services or connection status at the second layer.

19. The device of claim 12, wherein the network node identified as the root cause is located at a data link layer.

20. The device of claim 12, wherein the at least one processor is configured to:
    determine one or more error patterns by correlating the reporting information,
    wherein the network node or the connection between the network nodes as the root cause is identified further based on the one or more error patterns.

\* \* \* \* \*